United States Patent Office … 3,524,762 … Patented Aug. 18, 1970

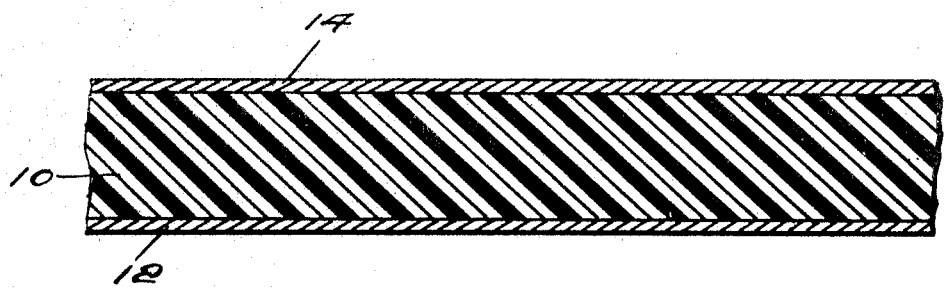
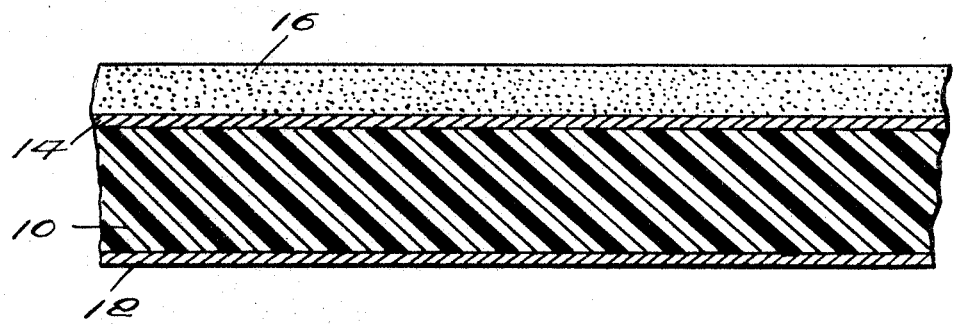

3,524,762
POLYESTER FILM COATED WITH WERNER CHROME COMPLEXES AND CHLORAL
Richard W. Bradt, Jr., Richmond, Va., and Russell T. Uhline, Orange, Tex., assignors to E. I. du Pont de Nemours and Company, Wilmington, Del., a corporation of Delaware
Filed Nov. 20, 1967, Ser. No. 684,130
Int. Cl. B23b 27/06
U.S. Cl. 117—138.8    5 Claims

ABSTRACT OF THE DISCLOSURE

Polyester film coated with a combination of two Werner chrome complexes and chloral, used for a photographic base, for magnetic tape and like applications.

BACKGROUND OF THE INVENTION

The mechanical properties and the chemical resistance of linear polyester films, particularly oriented polyethylene terephthalate film, have aided their commercial use in forms such as photographic base, in magnetic tape and in combination or laminates with weaker polymers. Despite their outstanding characteristics, it is evident that improvement in some of their properties and characteristics is desirable. For example, it is difficult to adhere other polymers to polyester surfaces. In addition, the high resistance of the polyester films to electrical charge movement leads to static accumulation and the possibility of discharge damage. In the polymerization of the polyester, small amounts of low molecular weight materials form; these remain in the film and may exude upon prolonged heating to form an undesirable haze on the surface and reduce the adhesivity of subsequently applied coatings.

Attempts have ben made in the prior art to overcome, individually, the aforementioned problems with some success. Exudate has been removed by wiping and washing the film after heat exposure. Antistatic agents of various kinds have been applied; for example, wetting agents such as sodium lauryl sulfate give temporary relief from static accumulations. Adhesion has been obtained by flame treatment and electrical discharge. Each of those treatments responds to but part of the problems indicated. Typical prior art of this general type includes the United States patents to Patten, No. 2,467,836; to DeWitt, No. 2,752,320; to Kingerley, No. 2,745,770; and to Nadeau et al. No. 3,201,251.

STATEMENT OF THE INVENTION

In accordance with the present discovery, there is provided a polyester structure, e.g. a film, having on at least one of its surfaces a coating composition composed of (1) a chromium complex of an aliphatic monocarboxylic acid of 10 to 22 carbon atoms, (2) a chromium complex of an organic monocarboxylic acid which is substituted with at least one polar group and contains 2 to 8 carbon atoms and (3) chloral, the coating composition being present to the extent of 4 to 50 mg. per square meter of surface coated. The acid containing the polar group, of complex (2), is of the formula PRCOOH, where P is a polar group such as $NH_2SO_2$—, $CN$—, $NO_2$—, or halogen, and R is —$CX_2$—, —$C_2X_4$—, or

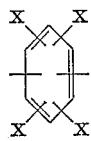

where X is hydrogen or a polar group as just defined and all X's need not be the same. This coating is an adherable, antiexudate and antistatic coating and constitutes a good subcoat over which can be applied a topcoat material for purposes of magnetic tape, photographic film and other applications.

The chromium complexes are known as Werner chrome complexes. General methods of preparing such complexes are described in Iler Pats. 2,273,040; 2,356,161; and 2,524,803; to which reference can be made, and which disclosures are incorporated herein by reference. The complexes can be prepared in alcoholic solutions, such as isopropanol, from basic chromic chloride by reaction with a suitable carboxylic acid. Typical Werner chrome complexes of type (1) above are provided where the acid employed is, for example, a long chain acid such as lauric acid, palmitic acid, myristic acid and stearic acid. Werner chrome complexes of type (2) above are obtained with acids such as trichloracetic acid, cyanoacetic acid, p-nitrobenzoic acid, p-sulfamyl benzoic acid, 2,3-dichloropropionic acid and 3,5-dinitrobenzoic acid. As is apparent, more than one electron withdrawing group can be substituted on the carbon backbone in the group (2) complexes. In each type of complex as used herein there are 1 to 10 chromium atoms per acido group, and preferably 2 to 5 chromium atoms per acid group. In use 1 to 8 parts of the polar complex is employed per part of nonpolar complex.

The Werner chrome complexes are conveniently prepared and used as stock solutions in alcohol of about 1 to 30 percent by weight chrome complex concentration. Using such stock solutions, about 10 to 60 or more parts by weight of chloral is used per part of the complex stock solution. A diluent can be included with the mixture of chloral and chrome complexes. The diluent would be employed in an amount such that it facilitates production of a thin continuous layer of coating when dry. A suitable dilution based on stock solution is 50 to 60 parts of diluent. When the diluent is water it may be desirable to add a wetting agent to spread the solution on the surface of the film, or add a water soluble compound such as n-propyl alcohol or n-butyl alcohol to reduce the water surface tension. Useful diluents in addition to water include tetrahydrofuran, methylethyl ketone, methyl isobutyl ketone and p-dioxane. In general, any solvent which does not deleteriously react with the components of the coating composition may be used. Large excesses of isopropyl alcohol react with chloral diminishing its ability to promote adhesion. The converse is true of water, where chloral hydrate is an effective adhesion promoter.

The base film employed in the present invention is composed of a polyester polymer. Polyesters generally including polycarbonates and copolymers of 80 percent or more of polyethylene terephthalate can be used, and the film or other shape thereof can be unoriented, unidirectionally oriented or biaxially oriented. A preferred base is asymmetrically biaxially oriented polyethylene terephthalate film as disclosed and claimed in the United States patent to Alles, No. 3,165,499, which disclosure is incorporated herein in its entirety by reference. The thickness of the substrate is determined by the use contemplated for the product, and generally ranges from about 0.1 mil to 30 mils or more in thickness.

In applying the coating composition of this invention to a substrate such as a film, the film can be dipped in the solution or the coating can be applied and controlled by doctor knives, kiss coater rolls, air knives, spray or other suitable methods known in the art. The diluent is removed by drying, normally in air. It has been found desirable to avoid heating the coated film over 105° C. during drying; excessive temperatures can cause loss of adhesion on subsequent application of a top coating. Although the reason for this is not fully understood, it is believed it may occur as follows. When a stearato chromic chloride complex dissolved in isopropyl alcohol is added to the diluent tetrahydrofuran, the color which is typical of the chemical combination and coordination sphere is green. When chloral is also present, the color of the solution is purple indicating a probable change in the coordination sphere perhaps by the substitution of chloral for isopropanol. Further, measurement of retained chloral in the coating after normal drying is of the same order of weight as the chromium in the coating. Heating above 105° C. removes this chloral and decreases the adhesivity of subsequent coating. It is thus postulated that adhesion is conferred not only by the inclusion of chloral in the formulation but by the retention of chloral or its compounds in the complex.

The combination of polar and nonpolar chrome complexes with chloral leads to a unique set of properties which are not achievable with the components separately. The importance of chloral is noted in the preceding paragraphs. It is surprising to combine a nonpolar complex normally used as a release coating in an antistatic preparation yet this addition improves the functionality without impairing the antistatic properties. The nonpolar component improves the exudate control, and the film handling in roll formation at high speeds.

The product of the invention is shown in the attached drawing, in which:

FIG. 1 is a view of a part of a film embodying the invention; and

FIG. 2 is a view of the film of FIG. 1 including a magnetic coating.

Referring to the drawing, a polyester film 10 is shown with the coating of this invention applied to both sides of the film, the coatings being indicated by the numbers 12 and 14. The scale of the drawing is exaggerated for simplicity. The coatings 12 and 14 can be as small as one thousandth the thickness of the base film 10 since only a very thin continuous coating is necessary to achieve the objectives of this invention. Although it may be desirable to top coat one or both sides of the coated film for use, the subcoats 12 and 14 serve to improve handling of the film, and avoid static formation during processing of the film even though only one side is top coated. In addition the coating of both sides of the base film simplifies handling during processing and avoids costly processing errors of mistakenly applying a top coat to the wrong side of the film.

In use, a top coat 16 (FIG. 2) is applied over one of the coating layers 12 or 14. Top coat 16 typically is a magnetic material-binder combination for magnetic tape, or a layer of vinylidene chloride copolymer followed by gelatine and photosensitive layers for photographic film.

The structures shown in the drawing are merely representative of the invention. As will be apparent to the artisan, other structures such as laminates can as well be prepared.

Particular properties of coated substrate reported hereinafter are determined as follows:

Exudate

The exudate of a treated film is measured after 2 hour exposure at 170° C. and is expressed in mg./m.². The amount of exudate on a given film may be determined by the following analytical procedure: The film to be analyzed for surface exudate is washed free of exudate with acetone. The weight difference of the film before and after washing divided by the area then yields the exudate per unit area. For washing the film sample, an 8″ x 8″ sample of the film is weighed and then placed between two 8″ x 8″ clean stainless steel screens and this assembly is then placed in a Thomas-Mitchell dipping tank. 200 ml. of acetone is added to the tank. By gently squeezing the tank with the fingers and releasing, the liquid level rises and falls thus assuring a thorough film wash. After the film is thoroughly washed (one minute is sufficient) the film and screens are then removed, the film is air dried and then reweighed. A very small amount of material is extracted from the film by acetone which for most work can be neglected. However, at very low exudate levels this can be significant and should be determined for the chosen wash cycle by repeated washing of a single piece of film. During a five minute wash, this extraction will account for approximately 0.1 mg./m.² of material.

A second or alternate method of exudate measurement is by haze formation. The exudate is formed as described above. A sample of film is placed in a Gardner Automatic Photometric Analyzer where the amount of transmitted light is measured. In general, the higher the haze level the greater the amount of exudate. The haze measurement is described in Bulletin No. 107, Gardner/Pivotable-Sphere Hazemeter.

Adhesion

The binder formulation to be tested is doctored on the film with a draw knife with a spacing to yield about a ½-mil coating when dry. The coating is allowed to air dry 72 hours. A razor blade is used to slash the top coating. The slashes are about 1 inch wide and about ten slashes are made over an inch in length. Pressure sensitive tape such as Scotch brand colored cellophane tape number 812 1 inch wide is pressed over the slashed section. A strip of tape 5 inches long is used. After smoothing the tape to the coating, the tape is immediately stripped with the opposite hand. The adhesion is rated as "10" for no coating removed, "8" for one or two flake, "4" for half removal and "0" for all coating stripped.

Surface resistivity

This property is measured in accordance with specification ASTM D–257–61. The electrodes are silver paint strips one inch long and spaced by one inch. The test voltage is 500 volts and the samples are conditioned at 50% relative humidity and 25° C. In general, the higher the surface resistivity the greater is the tendency to retain static charge.

The invention will be further described in conjunction with the following examples, in which parts and percentages given are by weight unless otherwise indicated or apparent.

Example 1.—A solution was prepared by mixing together, by weight, one part each of two chrome complexes, 80 parts of chloral, 0.7 part of a non-ionic wetting agent (polyoxyalkylene derivative of octyl phenol, Triton X–405, Rohm and Haas Co.), and 720 parts of water. Each complex was in solution in isopropyl alcohol and contained, by weight, 6 percent of chromium and about 15 percent of acido group. One complex was stearato chromic chloride and the second was p-sulfamyl benzoato chromic chloride.

The solution was doctored onto both sides of 1.5 mil oriented polyethylene terephthalate film 20 inches wide. The pickup of wet bath was 9 grams per square meter on each side of the film. The film was then dried in a drying tower with infrared heaters, with the temperature of the exiting film being 100° C. The dried film was then tested and the data obtained are in Table I.

Example 2.—A solution similar to Example 1 was prepared with 1 part each of the two chrome complexes, 120 parts of chloral and 632 parts of water, and including 48 parts of n-propyl alcohol in place of the wetting agent. Film as described in Example 1 was similarly coated, dried and tested. The data obtained are in Table 1. The weight gain determined on the dried film was 11 mg./m.².

Example 3.—A solution was prepared as in Example 1, omitting the wetting agent and water, and using tetrahydrofuran as the diluent. As before, film was coated, dried and tested. The results are shown in Table 1.

TABLE I

| Example | Exudate Mg./m.[2] | Haze percent | Adhesion PVC [1] | Surface resistivity (ohms per square) |
|---|---|---|---|---|
| Control [2] | 76.4 | [3] 32 | 0 | 5×10[16] |
| 1 | 18.3 | 5.6 | 10 | 5×10[14] |
| 2 |  | 5.6 | 10 |  |
| 3 |  | 5.0 | 10 |  |

[1] 10% solution of polyvinyl chloride in tetrahydrofuran, a magnetic particle binder (Geon 103 EP, Goodrich Chem. Co.).
[2] Uncoated polyester film.
[3] Unheated control, 14%.

These data demonstrate the effectiveness of the coating composition in providing adhesion, exudation control and reduced surface resistivity.

Example 4.—A solution was prepared in the manner of Example 2 with myristato chromic chloride complex in place of the stearato complex and p-nitrobenzoato chromic chloride as the polar chromic complex. Polyethylene terephthalate film was coated, dried and tested in accordance with the procedure of Example 1. The results obtained were comparable to those for Example 1, with good adhesion and exudate control and decreased resistivity resulting.

Example 5.—Aqueous solutions containing 30% by weight of freshly distilled chloral, 6% of n-propyl alcohol, and varying amounts of polar and nonpolar chrome complex were gravure coated on 12-inch wide polyethylene terephthalate film. The film was dried in a hot air tower with an exit temperature of 96° C. One side of the film was coated. The results of the surface resistivity and adhesion tests are shown in the table. As can be seen from those data, increasing the amount of polar complex decreases the surface resistivity, however, adhesion is sacrificed if the ratio of polar to nonpolar exceeds 8/1, or is substantially less than 1 to 1.

TABLE 2

| Sample | Chrome complexes | | Ratio polar to nonpolar | Surface resistivity, ohms/sq. | PVC adhesion |
|---|---|---|---|---|---|
| | Stearato, p.p.h.[1] | p-Sulfanyl-benzoato, p.p.h.[1] | | | |
| (a) | 0.38 | 0.38 | 1:1 | 3×10[15] | 10 |
| (b) | 0.38 | 0.75 | 2:1 | 5×10[14] | 10 |
| (c) | 0.38 | 1.50 | 4:1 | 4×10[12] | 10 |
| (d) | 0.38 | 3.0 | 8:1 | 1×10[11] | 10 |
| (e) | 0.38 | 6.0 | 16:1 | 1×10[11] | 4 |
| (f) | 0.75 | 3.0 | 4:1 | 2×10[10] | 10 |
| (g) | 1.5 | 0.75 | 1:2 | 3×10[13] | 4 |
| (h) | 1.5 | 1.5 | 1:1 | 4×10[11] | 10 |

[1] Parts of chrome complex stock solution as defined in Example 1 per hundred parts of coating bath.

From the foregoing discussion, description and data, it is evident that this discovery effectively provides coated polyester substrate of improved characteristics as to exudate and adhesion control and reduced surface resistivity. While the invention has been described with certain detail, it should be evident that changes therein can be made without departing from its scope.

What is claimed is:

1. A self-supporting film of a polyester polymer having on at east one of its surfaces 4 to 50 mg. per square meter of surface coated a coating composition comprising (a) a Werner chrome complex of an organic monocarboxylic acid containing 10 to 22 carbon atoms per molecule, (b) a Werner chrome complex of an organic monocarboxylic acid containing 2 to 8 carbon atoms and containing at least one polar substituent, and (c) chloral, wherein the weight ratio of said Werner complex (b) to Werner complex (a) is 1–8:1, and said chloral is present in an amount at least 10 times the combined weight of the Werner complexes.

2. A self-supporting film according to claim 1 in which said polyester is polyethylene terephthalate.

3. A self-supporting film of a polyester polymer having on at least one of its surfaces 4 to 50 mg. per square meter of surface coated a coating composition comprising (a) a Werner chrome complex of an organic monocarboxylic acid selected from the group consisting of lauric acid, palmitic acid, myristic acid and stearic acid, (b) a Werner chrome complex of an organic monocarboxylic acid containing 2 to 8 carbon atoms and having the formula PRCOOH, where P is a polar group selected from the group consisting of $NH_2SO_2-$, $CN-$, $NO_2-$ and halogen, and R is selected from the group consisting of $-CX_2-$, $-C_2X_4-$ and

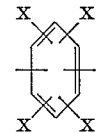

where X is hydrogen or a polar group as just defined, and (c) chloral, wherein the weight ratio of said Werner complex (b) to Werner complex (a) is 1–8:1, and said chloral is present in an amount at least 10 times the combined weight of the Werner complexes.

4. A self-supporting film according to claim 3 in which said acid in said Werner chrome complex (b) is selected from the group consisting of trichloroacetic acid, cyanoacetic acid, p-nitrobenzoic acid, p-sulfamyl benzoic acid, 2,3-dichloropropionic acid and 3,5-dinitrobenzoic acid.

5. A self-supporting film according to claim 4 in which said polyester is polyethylene terephthalate.

References Cited

UNITED STATES PATENTS 2,745,770    5/1956    Kingerley    117—139.5
3,287,141    11/1966    Bartz    106—287

WILLIAM D. MARTIN, Primary Examiner

J. E. MILLER, Jr., Assistant Examiner

U.S. Cl. X.R.

96—87; 106—243, 287; 117—47, 139.5, 167, 239